United States Patent
Grampassi

(10) Patent No.: US 10,342,242 B2
(45) Date of Patent: Jul. 9, 2019

(54) METHOD FOR CONTROLLING AN APPARATUS FOR DISPENSING FOOD PRODUCTS

(71) Applicant: S.P.M. DRINK SYSTEMS S.P.A., Spilamberto (MO) (IT)

(72) Inventor: Enrico Grampassi, Spilamberto (IT)

(73) Assignee: S.P.M. DRINK SYSTEMS S.P.A., Spilamberto (MO) (IT)

( * ) Notice: Subject to any disclaimer, the term of this patent is extended or adjusted under 35 U.S.C. 154(b) by 0 days.

(21) Appl. No.: 15/565,004

(22) PCT Filed: Apr. 8, 2016

(86) PCT No.: PCT/IB2016/052015
§ 371 (c)(1),
(2) Date: Oct. 6, 2017

(87) PCT Pub. No.: WO2016/162851
PCT Pub. Date: Oct. 13, 2016

(65) Prior Publication Data
US 2018/0098555 A1   Apr. 12, 2018

(30) Foreign Application Priority Data

Apr. 9, 2015 (IT) .................... 102015000011359
Apr. 9, 2015 (IT) .................... 102015000011363

(51) Int. Cl.
*A23G 9/22*    (2006.01)
*A23G 9/28*    (2006.01)

(52) U.S. Cl.
CPC ............ *A23G 9/228* (2013.01); *A23G 9/22* (2013.01); *A23G 9/281* (2013.01)

(58) Field of Classification Search
CPC .......... A23G 9/228; A23G 9/281; A23G 9/22
USPC ........................................... 222/58
See application file for complete search history.

(56) References Cited

U.S. PATENT DOCUMENTS

| 5,348,753 | A | * | 9/1994 | Ahnell | ............... | A23G 9/20 |
| | | | | | | 165/286 |
| 2006/0113322 | A1 | | 6/2006 | Maser et al. | | |
| 2007/0254084 | A1 | * | 11/2007 | Cocchi | .............. | A23G 9/28 |
| | | | | | | 426/565 |
| 2008/0202130 | A1 | * | 8/2008 | Kadyk | ............ | A23G 9/045 |
| | | | | | | 62/68 |
| 2011/0011887 | A1 | * | 1/2011 | Zaniboni | ............ | A23G 9/22 |
| | | | | | | 222/23 |

(Continued)

FOREIGN PATENT DOCUMENTS

| EP | 1 132 007 A2 | 9/2001 |
| EP | 1 849 368 A2 | 10/2007 |

(Continued)

*Primary Examiner* — Donnell A Long
(74) *Attorney, Agent, or Firm* — McGlew and Tuttle, P.C.

(57) ABSTRACT

The method for controlling an apparatus for dispensing food products envisages associating a tank (2) for containing the product to be dispensed with measuring means (10) for measuring the weight of the tank (2) itself and measuring the variations in said weight of the tank (2) with respect to a predetermined reference value. The weight variations in the product contained in the tank (2) are calculated according to said variations in the weight of the tank (2).

20 Claims, 1 Drawing Sheet

(56) References Cited

U.S. PATENT DOCUMENTS

| | | | |
|---|---|---|---|
| 2011/0165034 A1* | 7/2011 | Carlson | B67D 7/02 |
| | | | 422/261 |
| 2011/0189358 A1 | 8/2011 | Herbert | |
| 2011/0220677 A1* | 9/2011 | Bertolani | B60P 1/42 |
| | | | 222/1 |
| 2012/0048883 A1* | 3/2012 | Heckenberger | A61L 2/26 |
| | | | 222/1 |
| 2013/0043337 A1 | 2/2013 | Rukavina et al. | |
| 2016/0262422 A1* | 9/2016 | Biglari | A23G 9/224 |

FOREIGN PATENT DOCUMENTS

| | | |
|---|---|---|
| EP | 2 266 416 A1 | 12/2010 |
| EP | 2 508 080 A1 | 10/2012 |
| WO | 2009/034592 A1 | 3/2009 |
| WO | 2011/043784 A1 | 4/2011 |
| WO | 2013/050391 A1 | 4/2013 |
| WO | 2014/091393 A1 | 6/2014 |

\* cited by examiner

METHOD FOR CONTROLLING AN APPARATUS FOR DISPENSING FOOD PRODUCTS

TECHNICAL FIELD

The present invention relates to a method and a device for controlling the consumed product in an apparatus for preparing and dispensing such a product, in particular fluid or creamy food products, such as, e.g., hot beverages or refrigerated products of the type of granitas, creamy ice creams, sorbets and the like.

BACKGROUND ART

Apparatuses are currently known that allow preparing and instantly dispensing refrigerated products such as, e.g., beverages, granitas, creamy ice creams, sorbets and the like.

In particular, apparatuses are currently known comprising a tank suitable for containing the product to be dispensed, with which are associated means suitable for cooling the above-mentioned product at a predefined temperature. Inside the tank, a mixing device is housed which operates the continuous circulation of the product inside the tank itself. The mixing device, made up, for example, of a screw-feeder member, made to rotate according to a longitudinal axis of the tank, is suitable for conveying the chilled product towards a front area, where a product dispensing device is located. The dispensing device is provided with a shutter element which can be operated by an external lever member.

Apparatuses are also known that allow preparing and instantly dispensing hot beverages, especially beverages obtained by mixing water with soluble products in previously-set doses. Such apparatuses are generally equipped with a water-heating boiler, one or more containers for the soluble products and a device for mixing dosed quantities of water and soluble product. A dispensing device, arranged in a front area of the apparatus, permits dispensing the hot beverage thus prepared.

In the mentioned apparatuses, there is the need to control the consumed product. In particular, a need felt in the considered sector is to check that the used product is the one supplied by the producer and not another. It should be noted that often the above-mentioned countertop apparatuses are provided for use to operators of commercial premises, such as bars and cafés, restaurants and the like, by producers of products used in the apparatuses themselves, so it is in the interest of these companies that the apparatuses are not used with third-party products.

In addition to an economic value, the control of the origin of the dispensed products also responds to the need to ensure their constant quality. It is in fact clear that such an assurance could not be provided if a product of unknown origin were used, thereby also bringing about the debasement of the characteristics of the concerned apparatuses.

WO 2011/043784 describes an apparatus for mixing the ingredients of a frozen mixture, comprising a mixing chamber which receives the ingredients to be mixed and a blade suitable for being made to rotate inside the mixing chamber, to blend the ingredients. The apparatus can be equipped with weight sensors for measuring the weight of the ingredients introduced into the mixing chamber. The weight sensors supply the measured values to a control unit so as to correctly measure the ingredients. In particular, the weight sensors measure the weight of the mixing chamber bottom which is floating with respect to the side walls.

US 2013/0043337 describes an apparatus for controlling the mixing of liquid and ice in the preparation of ice-cold beverages. The apparatus comprises a casing associated with a base and a container for the ice arranged above the casing. A plurality of load cells is arranged between the casing and the ice container to monitor the weight of the ice container. The apparatus allows measuring the consumption of ice, so as to blend a constant quantity of ice in the beverages.

The known apparatuses do not permit controlling the consumed product over time, so as to verify when the amount of product initially supplied to the operator is running low.

Another requirement of the mentioned apparatuses is to easily control the different parameters which determine its operation, such as, for example, the temperature inside the tank and the like. To this end, the use is already known of apparatuses provided with suitable sensor elements that permit detecting some such parameters. It is not however usually possible to effectively manage the measured values, for example to control the correct use of the apparatus.

DETAILED DESCRIPTION OF THE INVENTION

The aim of the present invention is to solve the mentioned problems, by providing a method that allows the optimal control of the consumed product in an apparatus for preparing and dispensing such product, in particular fluid or creamy food products.

In the ambit of such aim, a further object of the present invention is to provide a method which allows managing the supply of the product to operators.

Another object of the invention is to provide a device which allows effectively realizing the above method.

Another object of the invention is to provide a device for controlling the consumed product which has a simple construction and functional concept, definitely reliable operation, is versatile to use, and which has a relatively low cost.

Yet another object of the invention is to provide a method and a device that allows performing the remote control of the functional parameters of the apparatus.

The above mentioned objects are achieved, according to the present invention, by the method and the control device according to claims 1 and 6.

According to the present invention, the method for controlling the consumed product in an apparatus for dispensing such product envisages associating a tank for containing the product to be dispensed with measuring means for measuring the weight of the tank itself; measuring the variations in said weight of the tank with respect to a predetermined reference value; calculating the variations in the weight of the product contained in the tank according to said variations in the weight of the tank; calculating the consumed product with respect to the initial supply of the product itself, according to said variations in the weight of the product contained in the tank; sending the measurements of the consumed product to an external control unit predisposed to manage the apparatus.

Advantageously, the method provides for sending said measurements of the consumed product to said external control unit by remote control means.

Advantageously, the method provides for inhibiting the normal operation of the apparatus once said initial supply has been completely consumed.

Advantageously, the method for controlling an apparatus for dispensing food products envisages associating with said apparatus sensor means of a plurality of functional parameters; measuring by means of said sensor means the state and/or the variations in said functional parameters; and sending the obtained data to an external control unit predisposed to manage the apparatus by remote control means.

The invention also concerns a device for controlling the consumed product in an apparatus for dispensing fluid or creamy food products, comprising measuring means for measuring the weight of the containment tank of the product to be dispensed; processing means predisposed to measure the variations in said tank weight with respect to a predetermined reference value and calculating the variations in the weight of the product contained in said tank on the basis of said variations in the tank weight; and remote control means predisposed to send the consumed product measurements to an external control unit predisposed to manage the apparatus.

The apparatus comprises heat treatment means of the product contained inside said tank and a dispensing device of said product frontally associated with said tank.

Advantageously, said measuring means of the weight of said tank comprise at least one load cell.

Preferably, said measuring means of the weight of said tank comprise a plurality of load cells.

Preferably said load cells are integrated in corresponding support feet of the base of said tank.

Advantageously, said remote control means are predisposed to use GPRS or TCP/IP technologies to send data to a web portal.

Preferably, said remote control means are predisposed to use cellular mobile phones.

The invention also concerns an apparatus for dispensing fluid or creamy food products, comprising a tank for containing the product to be dispensed; heat treatment means of the product contained inside said tank; a mixing device predisposed to operate the continuous circulation of said product inside said tank; a dispensing device of said product frontally associated with said tank; sensor means predisposed to detect a plurality of functional parameters of said apparatus; an internal control unit predisposed to manage the values measured by said sensor means.

The apparatus comprises measuring means for measuring the weight of said tank and processing means associated with said internal control unit, predisposed to measure the variations in said weight of the tank with respect to a predetermined reference value and calculating the variations in the weight of the product contained in said tank on the basis of said variations in the tank weight.

Advantageously, the apparatus comprises remote control means predisposed to send the consumed product measurements to an external control unit predisposed to manage the apparatus.

BRIEF DESCRIPTION OF THE DRAWINGS

The details of the invention will become better evident from the detailed description of a preferred embodiment of the device for controlling an apparatus for dispensing food products, illustrated by way of example in the accompanying drawings, wherein.

EMBODIMENTS OF THE INVENTION

Figure 1:
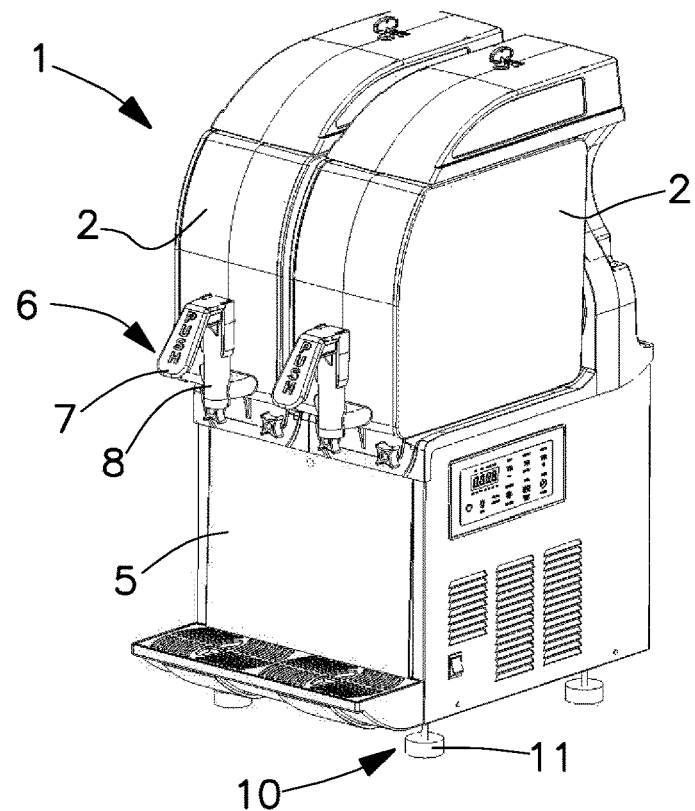
FIG. 1 shows a perspective view of an apparatus for dispensing refrigerated food products equipped with the control device according to the present invention.
Figure 2:
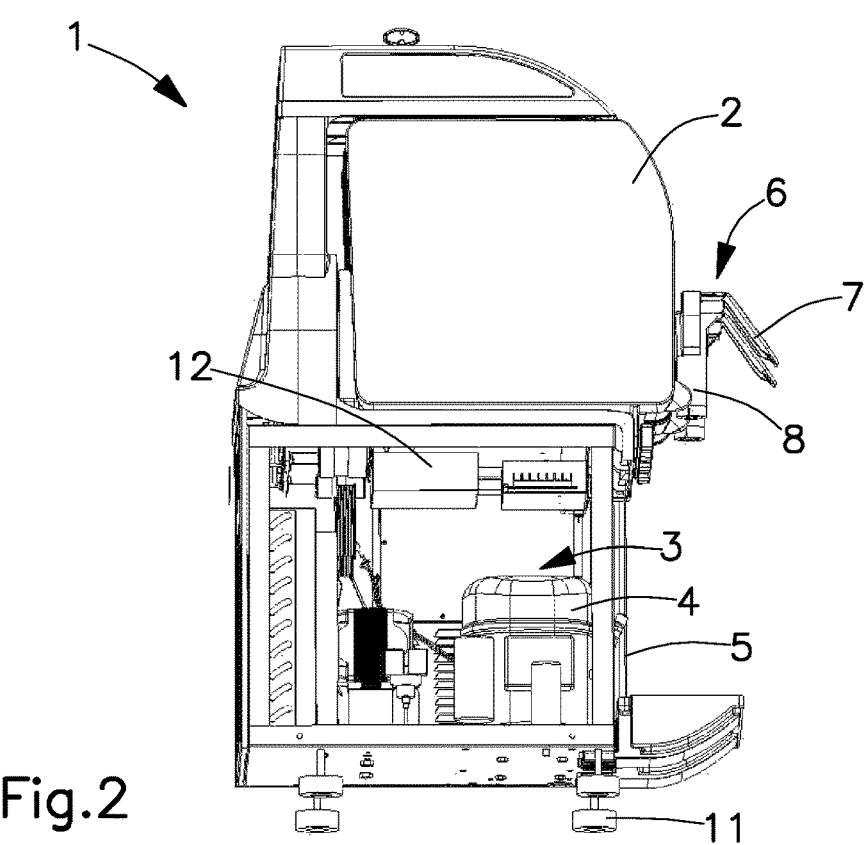
FIG. 2 shows a side view of such apparatus, with parts removed to highlight parts inside the apparatus itself.

With particular reference to such figures, indicated by 1 is an apparatus for preparing and dispensing refrigerated products, such as granitas, creamy ice creams, sorbets and the like, equipped with the device for controlling the consumed product according to the present invention.

The apparatus 1 comprises at least one tank 2 for containing the product to be dispensed, inside which the product heat treatment means are arranged, which are in themselves known. In particular, such heat treatment means comprise a refrigeration system 3 provided with a compressor 4 which acts on a coolant fluid which circulates in a cooling coil; the coil is placed inside a cooling cylinder arranged with horizontal axis inside the tank 2, not shown in the drawing.

The containment tank 2 is mounted on top of a base body 5 with a substantially prismatic shape. The base body 5 is predisposed to contain inside itself the operating parts of the apparatus, among which the compressor 4 of the refrigeration system 3. In the case shown in the illustrations, the apparatus envisages a pair of tanks 2, identically shaped and arranged side by side on top of a base body 5, for example, for preparing and dispensing different flavors of the refrigerated product. It is however obviously possible to provide for the presence of a different number of containment tanks, in particular just one single tank.

The containment tank 2 is preferably made of transparent plastic material. On the front of the containment tank 2 there is a dispenser device 6 fitted in a known manner with a shutter member that can be operated by means of an external lever member 7. The shutter member is sliding inside a cylindrical seat, with a substantially vertical axis, made up of a sleeve 8 shaped by the tank 2.

According to the present invention, the apparatus is provided with measuring means 10 of the weight of the containment tank 2. In particular, such measuring means 10 envisage at least one load cell 11 and preferably at least one pair of load cells 11 integrated in the support feet of the base 5 of the tank 2, for example, the feet arranged at the front. In this case, the load cells 11 are predisposed to perform the measurement of the weight of the entire apparatus 1, including the weight of the product contained inside the tank 2. By the expression "weight of the containment tank 2", in the present context, is therefore meant the weight of the tank 2 and its contents possibly added to the weight of parts of the apparatus to which the tank 2 itself is connected, to the extent of integrating the entire weight of the apparatus.

The load cells 11 are connected to an internal control unit predisposed to manage the measured values. In practice, the internal control unit comprises a suitable electronic board that manages the operation of the apparatus. The control unit is contained inside a box 12 arranged in the base body 5 of the apparatus. In particular, the control unit is equipped with remote control means of the detected consumption values and the management of the functionality of the apparatus, as specified below. Preferably, such remote control means use GPRS or TCP/IP technology to send the data to a suitable web portal.

Such remote control means are also predisposed to send the value of other operating parameters of the machine, detected by suitable sensor means connected to said internal control unit. In particular, the monitorable parameters may comprise, in addition to the weight, the position of the apparatus, the general switching on, possible movements, the switching on of the compressor, the condenser temperature and that of the evaporator, the screw-feeder member switch and that of the tank cover, the switching on of the LEDs, the rotation of the gear motor which drives the screw-feeder member, the enabling and disabling of the remote control, the error codes emitted by the controller dedicated to managing the peripheral units.

The operation of the device for controlling the consumed product is easily understandable from the foregoing description.

The sensors associated with the apparatus permit measuring a plurality of functional parameters.

In particular, the load cells 11 permit measuring the weight of the apparatus continuously or at predetermined intervals, during the daily work cycle. The internal control unit arranged on board the apparatus also allows comparing the measured value with a predetermined reference value, for example, the empty weight of the apparatus itself and, consequently, measuring weight variations. These weight variations are clearly determined by the progressive consumption of the product introduced into the tank 2.

This way, when the quantity of the product initially provided to the operator is known, it is possible to verify when such product is running low or has run out. At this point it is possible for example to inhibit the normal operation of the apparatus, e.g., by disabling the operation of the refrigeration system. This ensures that a product of unknown origin is not used in the apparatus.

In this condition it is usefully predictable that the apparatus can only perform periodic cleaning operations. Normal operation will instead be restored once the operator has requested a new supply of the product.

It must be observed that, according to the method according to the present invention, the detected data are sent remotely to an external control unit placed inside an operating facility linked to the producer who can thus control substantially in real time the consumption of the products supplied to the operators.

Such operating facility can also remotely control any other apparatus functional parameters detected by the suitable sensor elements. This allows, inter alia, intervening to vary the operating parameters remotely or correcting any anomalies.

The method and the device according to the present invention therefore achieve the object of perfectly controlling the consumed product in an apparatus for preparing and dispensing such product, in particular fluid or creamy food products.

In particular, the device permits inhibiting the dispensing of products of uncontrolled origin, stopping the normal operation of the apparatus and the dispensing of the product when the entire quantity of supplied product has been used up.

A prerogative of the device according to the present invention consists of the fact that it gives the producer ample control over the ways its products are consumed, e.g., recording the sales quantities of the different products to individual customers, the sales variations over time, the periods of major consumption.

The device described by way of example is susceptible to numerous modifications and variations according to the different needs. By way of example, its use has been described in an apparatus for preparing and dispensing refrigerated products but it is equally suitable for use in apparatuses for preparing and dispensing hot beverages and the like.

In the practical embodiment of the invention, the materials employed, as well as the shape and the dimensions, may be any according to requirements.

Where the technical features mentioned in each claim are followed by reference marks such reference marks have been included for the sole purpose of increasing the understanding of the claims and accordingly they do not have any limitative value as regards the purpose of each element identified by way of example by such reference marks.

The invention claimed is:

1. A method for controlling an apparatus for dispensing fluid or creamy food products, the method comprising:
    associating said apparatus with a measuring means for measuring a weight of said entire apparatus;
    measuring variations in said weight of said apparatus with respect to a predetermined reference value;
    calculating weight variations in said product contained in said apparatus according to said variations in said weight of said apparatus;
    calculating consumed product starting from an initial supply of said product, according to said variations in said weight of said product contained in said apparatus;
    sending said measurements of said consumed product to an external control unit predisposed to manage said apparatus by a remote control means.

2. A method according to claim 1, further comprising:
    associating a sensor means with said apparatus for detecting a plurality of functional parameters;
    measuring one or more of a state of said functional parameters and variations in said functional parameters;
    sending obtained data to said external control unit predisposed to manage said apparatus by said remote control means.

3. A method according to claim 2, wherein said obtained data is sent to said external control unit by said remote control means using general packet radio service (GPRS) or transmission control protocol/internet protocol (TCP/IP) technologies.

4. A method according to claim 2, wherein said data is sent by said remote control means using cellular mobile phones.

5. A method according to claim 1, further comprising:
    inhibiting a normal operation of the apparatus once said initial supply has been completely consumed.

6. A method according to claim 1, wherein said associating said apparatus with said measuring means comprises providing at least one load cell integrated in a support foot of a base of a tank of said apparatus.

7. A method according to claim 6, wherein said support foot defines a lowermost portion of said apparatus.

8. A method according to claim 1, wherein a dispensing location of said apparatus is free of support from any portion of said apparatus.

9. A method according to claim 1, wherein no portion of said apparatus is provided at a dispensing location of said apparatus.

10. A device for controlling an apparatus for dispensing fluid or creamy food products, the apparatus comprising a tank for containing a product to be dispensed, a heat treatment means of said product contained inside said tank and a dispensing device of said product frontally associated with said tank, the device comprising:
    a measuring means for measuring a weight of said apparatus;
    a processing means for measuring variations in said weight of said entire apparatus with respect to a predetermined reference value and calculating the variations in product weight of said product contained in said apparatus based on said variations in said weight of said entire apparatus;
    a remote control means for sending consumed product measurements to an external control unit for managing the apparatus.

11. A device according to claim 10, further comprising a sensor means for detecting a plurality of functional parameters associated with said apparatus.

12. A device according to claim 11, wherein said functional parameters comprise at least one of a position of said apparatus, a general switching on of said apparatus, a switching on of said heat treatment means, a temperature determined by said heat treatment means, an activation of a product mixing means inside said tank, enabling of the remote control means and one or more error codes emitted by a controller dedicated to managing at least a plurality of peripheral units.

13. A device according to claim 10, wherein said measuring means of said tank weight comprises at least one load cell integrated in a support foot of a base of said tank.

14. A device according to claim 10, wherein said remote control means uses general packet radio service (GPRS) or transmission control protocol/internet protocol (TCP/IP) technologies to send data to a web portal.

15. A device according to claim 10, wherein said weight includes a weight of each and every component of said apparatus.

16. A device according to claim 10, wherein said weight does not include a weight of a portion of said apparatus at a dispensing location of said apparatus.

17. An apparatus for dispensing fluid or creamy food products, the apparatus comprising:
a tank for containing a product to be dispensed;
a heat treatment means of the product contained inside said tank;
a mixing device for continuous circulation of said product inside said tank;
a dispensing device of said product frontally associated with said tank;
a device for controlling the apparatus, the device comprising:
  a measuring means for measuring a weight of said entire apparatus;
  a processing means for measuring variations in said weight of said entire apparatus with respect to a predetermined reference value and calculating the variations in product weight of said product contained in said apparatus based on said variations in said weight of said entire apparatus;
  a remote control means for sending consumed product measurements to an external control unit for managing said apparatus.

18. An apparatus according to claim 17, wherein said measuring means comprises at least one load cell integrated in a support foot of a base of said tank of said apparatus.

19. An apparatus according to claim 18, wherein said support foot defines a lowermost portion of said apparatus.

20. An apparatus according to claim 17, wherein a dispensing location of said apparatus is free of support from any component of said apparatus.

* * * * *